United States Patent [19]

Gremillion et al.

[11] Patent Number: 4,906,909

[45] Date of Patent: Mar. 6, 1990

[54] ANALOG ELECTRONIC CONTROL DIFFERENTIAL TRANSMITTER

[75] Inventors: Jeffrey C. Gremillion, Salem; William P. Huntley, Old Lyme, both of Conn.

[73] Assignee: The United States of America as represented by the Secretary of the Navy, Washington, D.C.

[21] Appl. No.: 345,817

[22] Filed: Apr. 28, 1989

[51] Int. Cl.[4] .................. G05B 1/06

[52] U.S. Cl. .................. 318/656; 318/605; 318/654; 341/116; 341/117; 340/870.21; 340/870.34

[58] Field of Search .................. 341/112-117; 318/600, 562, 653, 654, 655, 656, 685, 661, 584, 605; 364/603, 730, 608; 340/870.21, 870.25, 870.30, 870.34, 686, 670, 671, 672

[56] References Cited

U.S. PATENT DOCUMENTS

| | | | |
|---|---|---|---|
| 3,662,379 | 5/1972 | Miller et al. | 341/117 |
| 3,868,680 | 2/1975 | Rhodes | 341/116 |
| 4,062,005 | 12/1977 | Freed et al. | 340/870.21 X |
| 4,084,121 | 4/1978 | Steglich | 318/654 |
| 4,119,958 | 10/1978 | Simon et al. | 341/116 X |
| 4,583,079 | 4/1986 | Simon | 341/116 |
| 4,598,289 | 7/1986 | Marin et al. | 340/870.34 |
| 4,843,291 | 6/1989 | Predina | 318/605 |

*Primary Examiner*—William M. Shoop, Jr.
*Assistant Examiner*—Paul Ip
*Attorney, Agent, or Firm*—Prithvi C. Lall; Michael J. McGowan

[57] ABSTRACT

A linear, analog, synchro control differential transmitter for implementing the common synchro CDX function whereby a scaled linear analog voltage is used as input instead of a mechanical shaft angular displacement. Alternate synchro functions of CT and CX that the invention implements are also disclosed.

18 Claims, 6 Drawing Sheets

ANALOG ELECTRONIC CONTROL DIFFERENTIAL TRANSMITTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to synchro-servo system control and more particularly to an analog, "infinite" resolution, synchro control differential transmitter, where "infinite" resolution connotes theoretically infinite resolution (versus digitally finite resolution) because resolution is always, as a practical matter, limited by various noise mechanisms.

(2) Description of the Prior Art

It is well known that synchro-servo control systems have been used for many years for remote positioning of mechanical devices. FIGS. 1A and B depict the symbol and schematic diagram respectively of a synchro control transmitter, referred to hereinafter as a "CX". An input AC voltage is applied across the rotor terminals R1 and R2 as $V_{R1-R2}$ which is defined as, $$V_{R1-R2}=K_{R1-R2}\ \mathrm{SIN}\ \omega t \quad (1)$$

where $K_{R1-R2}$ represents an input root mean square (RMS) voltage and $\omega=2\pi f$, f being the input voltage frequency which is typically 60 Hz or 400 Hz. The output voltages appear across stator terminals S1, S2, and S3 as $V_{S1-S3}$, $V_{S2-S3}$ and $V_{S1-S2}$. These synchro output voltages, depicted by '$\theta$', are functions of shaft angle $\theta$, i.e., the relative angle between the rotor and stator, and are defined as;

$$V_{S1-S3}=K_{S1-S3}\ \mathrm{SIN}\ \omega t \quad (2)$$

$$V_{S2-S3}=K_{S2-S3}\ \mathrm{SIN}\ \omega t \quad (3)$$

$$V_{S1-S2}=K_{S1-S2}\ \mathrm{SIN}\ \omega t \quad (4)$$

where $$K_{S1-S3}=R[K_{R1-R2}\ \mathrm{SIN}\ \theta] \quad (5)$$

$$K_{S2-S3}=R[K_{R1-R2}\ \mathrm{SIN}\ (\theta+120)] \quad (6)$$

$$K_{S1-S2}=R[K_{R1-R2}\ \mathrm{SIN}\ (\theta+240)]. \quad (7)$$

Note that an angular signal in ' ', as used in FIG. 1 et seq., indicates a set of synchro or resolver voltages corresponding to that angular signal.

The transformation ratio "R" of output-to-input, graphically illustrated in FIG. 2, is the maximum line-to-line output RMS voltage, i.e., for a particular CX, the maximum RMS voltage across any two stator terminals divided by the specified constant input RMS voltage, $$R=[K_{S1-S3}(max)]\div[K_{R1-R2}] \quad (8)$$

Typically, the input voltage to synchro devices is 115 $V_{RMS}$, while the maximum output voltage is 90 volts line-to-line RMS, $V_{L-L}$RMS. Thus, $$R=90\div 115=0.7826. \quad (9)$$

FIG. 3 depicts the symbol for a synchro control transformer, or a "CT". It's output voltage, available across rotor terminals R1 and R2 as $V_{R1-R2}$, is a function of the input synchro voltages, which correspond to an angle $\theta$, and the shaft angle $\theta$, where, $$V_{R1-R2}=K\ \mathrm{SIN}\ (\phi-\theta), \quad (10)$$

and where, $$K=K_o\ \mathrm{SIN}\ \omega t, \quad (11)$$

$K_o$ being a constant which includes R and the input maximum line-to-line RMS voltage.

FIG. 4 shows a typical system. Excitation is applied to the CX input and the output is an AC voltage whose amplitude is proportional to the SINE of the difference between the CX shaft angle $\phi$ and the CT shaft angle $\theta$, $$V_{R1-R2}=K\ \mathrm{SIN}\ (\phi-\theta). \quad (12)$$

FIG. 5 illustrates the symbol for a synchro control differential transmitter, or a "CDX". Its output voltages, available across rotor terminals R1, R2, and R3, are a function of the input synchro voltages, which correspond to an input angle $\phi$, and the shaft angle $\theta$, such that the output corresponds to the angular difference $\phi-\theta$.

FIG. 6 demonstrates how a CDX is employed in a typical system. Excitation is applied to the CX and the output is an AC voltage whose amplitude is proportional to the SINE of the CX shaft angle $\phi$ minus the CDX shaft angle $\theta$, and minus the CT shaft angle $\beta$, $$V_{R1-R2}=K\ \mathrm{SIN}\ (\phi-\theta-\beta). \quad (13)$$

By crossing a given pair of stator leads or rotor leads, the output can be made a function of any desired sum or difference of the input angles. One example of this is given in FIG. 7. By starting with the system of FIG. 6 but connecting the S1 terminal of the CX to the S3 terminal of the CDX and connecting the S3 terminal of the CX to the S1 terminal of the CDX, the output is changed from corresponding to $\phi-\theta-\beta$ to corresponding to $-(\phi+\theta+\beta)$.

An electronic CDX, or an "ECDX", is a CDX whose "shaft angle" input is not an actual mechanical shaft, but a voltage level scaled, usually but not necessarily, linearly to a fictitious "shaft angle." It is understood that with all the electronic control synchro-servo systems in use or under development, it is not always convenient to have to drive an actual mechanical shaft. Many times the control signal is already in voltage form and to convert that voltage to drive the shaft of an actual electro-mechanical CDX, as illustrated in FIG. 8, has many disadvantages. The first disadvantage is that the input voltage cannot be infinite. An actual synchro shaft, however, can be turned an infinite number of degrees, i.e., continuous rotation. This is an obvious and trivial disadvantage with all known electronic CDX's as many CDX applications do not require continuous shaft rotation. Other disadvantages of the FIG. 8 implementation are that it; requires moving parts, is a large and bulky design, has a high parts count, exhibits servo feedback loop instability, requires fine mechanical precision, and is mechanically complex. The one advantage of this implementation, however, is "infinite" resolution.

FIG. 9 illustrates another common implementation, i.e., an analog/digital electronic CDX. A digital, solid-state CDX such as that shown is commercially available. The A/D converter converts an input analog voltage to a digital word which corresponds to the shaft angle. The advantages of this technique are that it; requires no moving parts, is of reduced size, and is very stable due to the absence of feedback. Its disadvantage is finite resolution due to digitization.

SUMMARY OF THE INVENTION

Accordingly, it is a general purpose and object of the present invention to provide an improved synchro electronic CDX (ECDX) having "infinite" resolution. It is a further object that the ECDX be linear over a wide range of inputs. Another object is that the ECDX accept a linear analog voltage input. Still another object is that the ECDX provide synchro control differential transformation.

These objects are accomplished with the present invention by providing a linear, analog, synchro control differential transmitter means for implementing the common synchro CDX function whereby a scaled linear analog voltage is used as input instead of a mechanical shaft angular displacement. Alternate synchro functions of CT and CX that the invention implements are also disclosed.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1A:
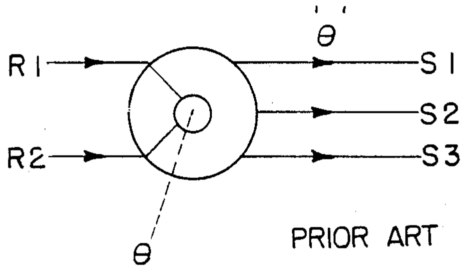
FIGS. 1A and 1B show prior art CX symbol and schematic diagrams respectively.
Figure 1B:
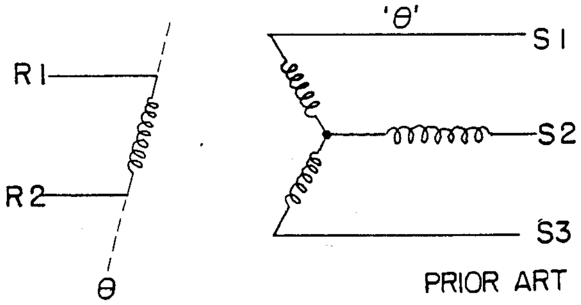
Figure 2:
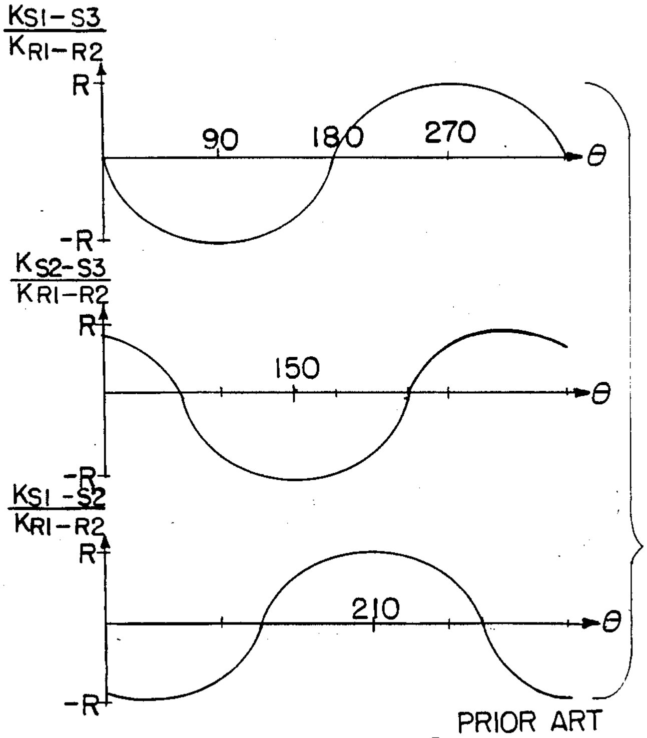
FIG. 2 shows transformation relationships for the CX of FIG. 1.
Figure 3:
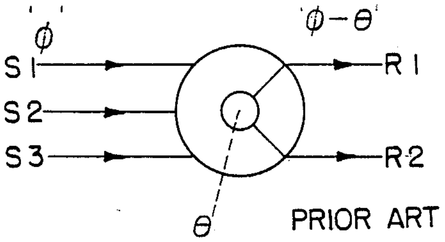
FIG. 3 shows a symbol diagram for a prior art CT.
Figure 4:
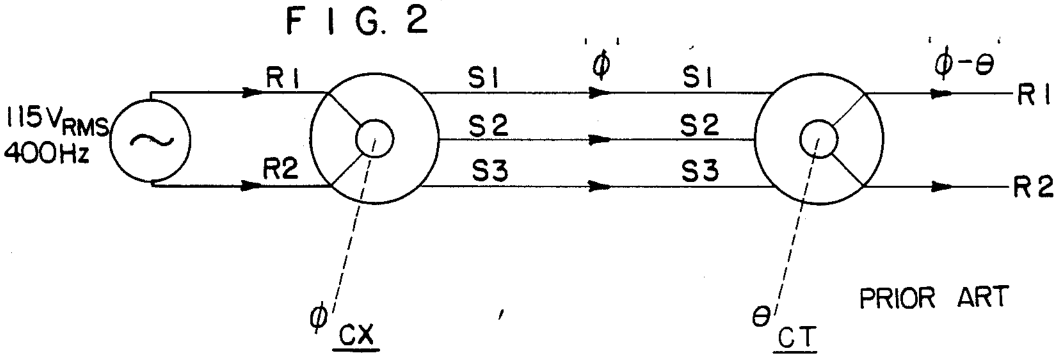
FIG. 4 shows a typical prior art CX-CT system.
Figure 5:
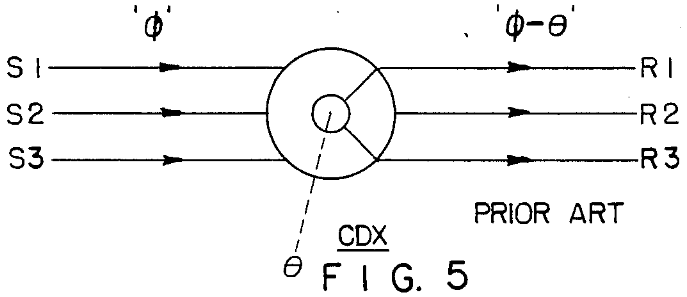
FIG. 5 shows a symbol diagram for a prior art CDX system.
Figure 6:
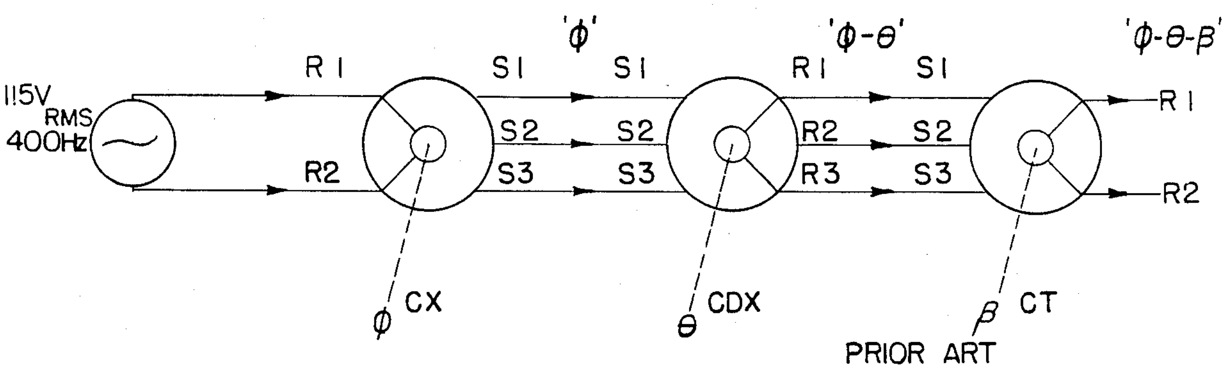
FIG. 6 shows a typical prior art CX-CDX-CT system.
Figure 7:
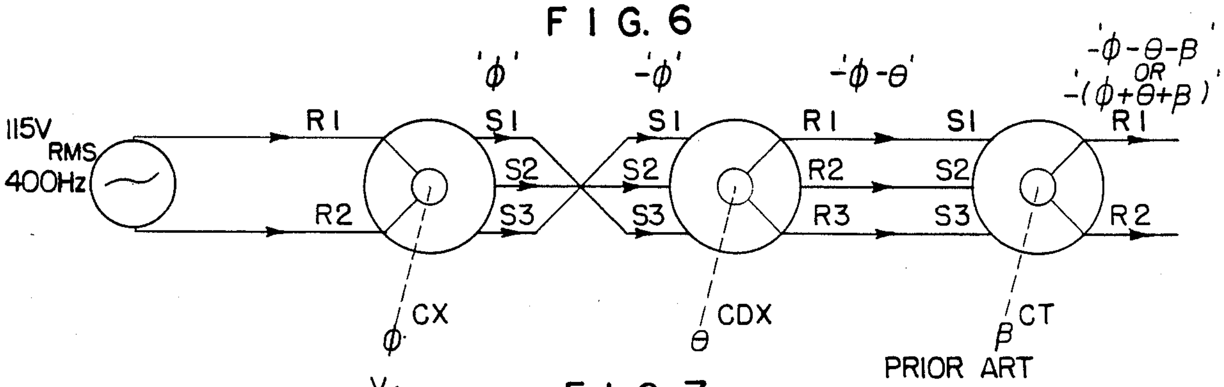
FIG. 7 shows another typical prior art CX-CDX-CT system.
Figure 8:
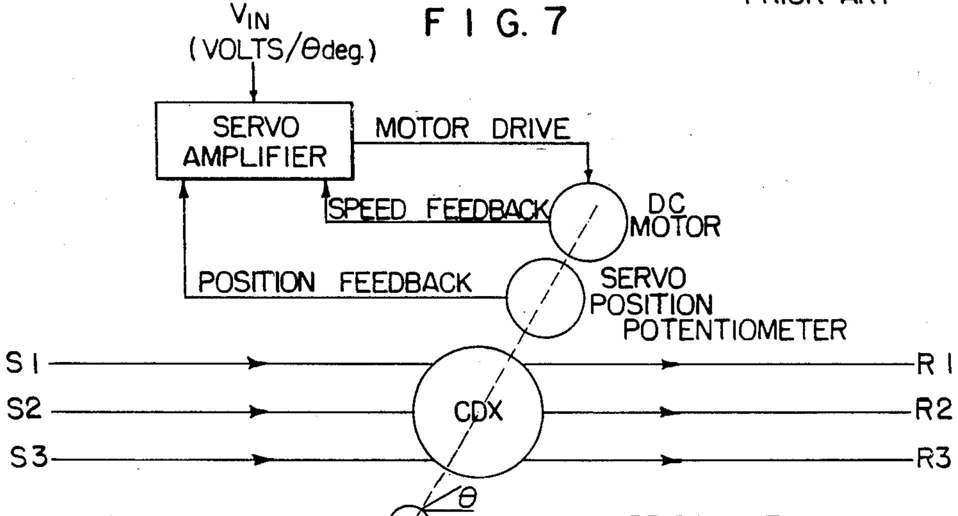
FIG. 8 shows a prior art electro-mechanical CDX system.
Figure 9:
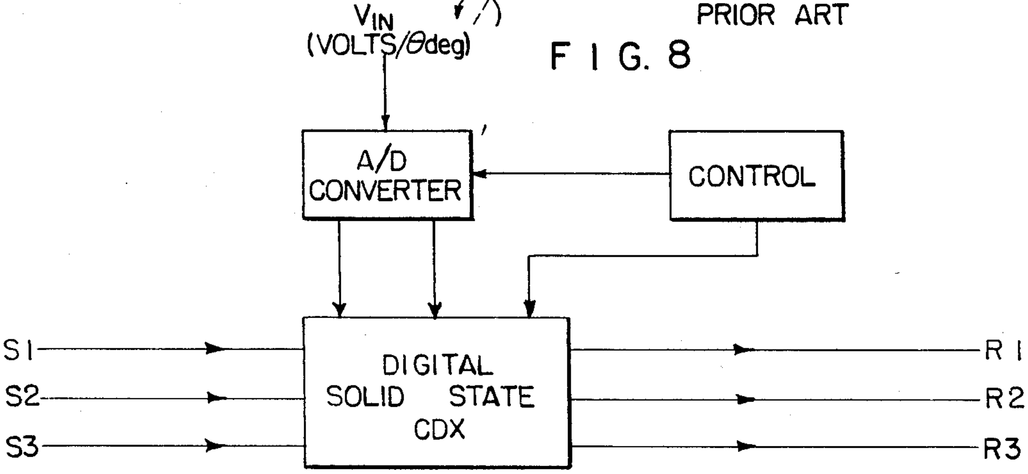
F I G. 9 PRIOR ART
FIG. 9 shows a prior art analog/digital electronic CDX.
Figure 10A:
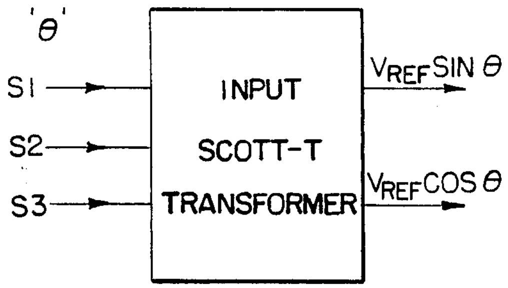
PRIOR ART F I G. 10A
FIGS. 10A and B show the transfer characteristics of prior art Scott-T input and output transformers respectively.
Figure 10B:
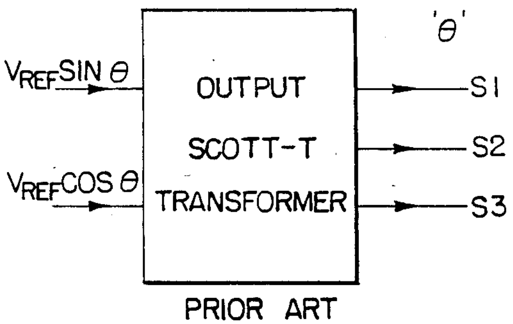
PRIOR ART F I G. 10B

Referring now to FIGS. 10A and B there is shown input and output Scott-T transformers, each of which are commercially available synchro-to-resolver or resolver-to-synchro devices respectively. Their transfer characteristics are also as depicted in FIGS. 10A and 10B. In FIG. 10A the input to the input Scott-T transformer is '$\theta$'. The input transformer produces two output signals, "SIN", and "COS", such that the "SIN" output is $$K[\text{SIN } \theta][\text{SIN } \omega t] \text{ or } V_{REF}[\text{SIN } \theta] \tag{14}$$

and the "COS" output is $$K[\text{COS } \theta][\text{SIN } \omega t] \text{ or } V_{REF}[\text{COS } \theta] \tag{15}$$

where, $$V_{REF}=K[\text{SIN } \omega t]. \tag{16}$$

The output Scott-T transformer of FIG. 10B is simply the inverse of the input transformer of FIG. 10A, functioning to reconvert "SIN" and "COS" input signals to '$\theta$'.

Figure 11:
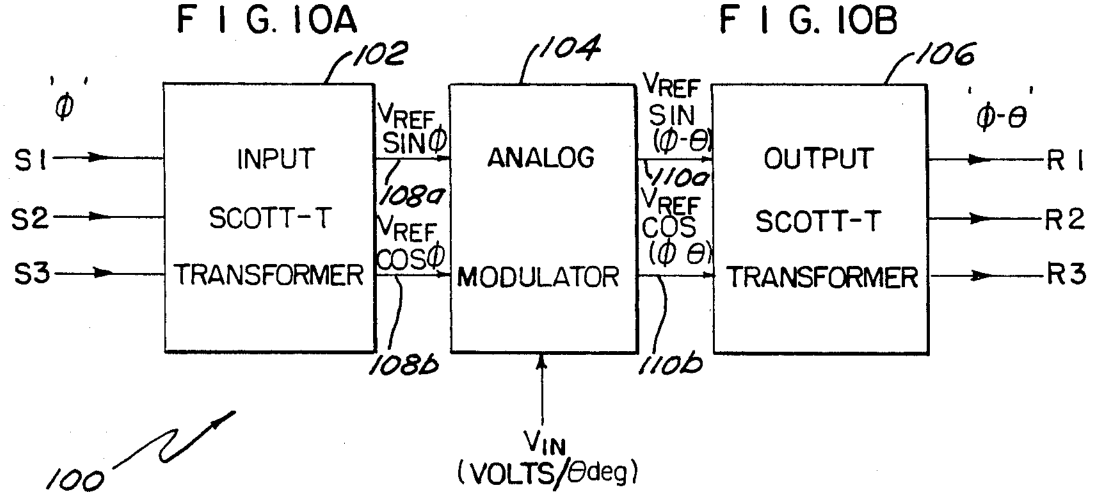
FIG. 11 shows a basic block diagram of an AECDX.

FIG. 11 shows a block diagram of an analog electronic CDX (AECDX) device 100 comprising; an input Scott-T transformer 102, an analog modulator 104 and an output Scott-T transformer 106. Input transformer 102 receives '$\phi$' and produces outputs $V_{REF}$SIN $\phi$ and $V_{REF}$COS $\phi$ therefrom. An analog modulator 104 receives the outputs of input transformer 102 and also an analog input voltage angle $V_{IN}$ (Volts/$\theta$deg.), producing as outputs $V_{REF}$SIN $(\phi-\theta)$ and $V_{REF}$COS $(\phi-\theta)$ therefrom. These outputs from analog modulator 104 are received by output Scott-T transformer 106 which then produces '$(\phi-\theta)$' therefrom. This invention employs analog computational integrated circuits, which are readily available "off-the-shelf" electronic components, to modulate the "SIN" and "COS" signals so as to incorporate the analog input voltage angle $\theta$ before reconversion back to synchro data, as depicted the AECDX basic block diagram of FIG. 11. The key to this invention is the analog computational circuitry of analog modulator 104. It will be shown that the functions of CX and CT are specific case of the CDX function with this technique.

Figure 12:
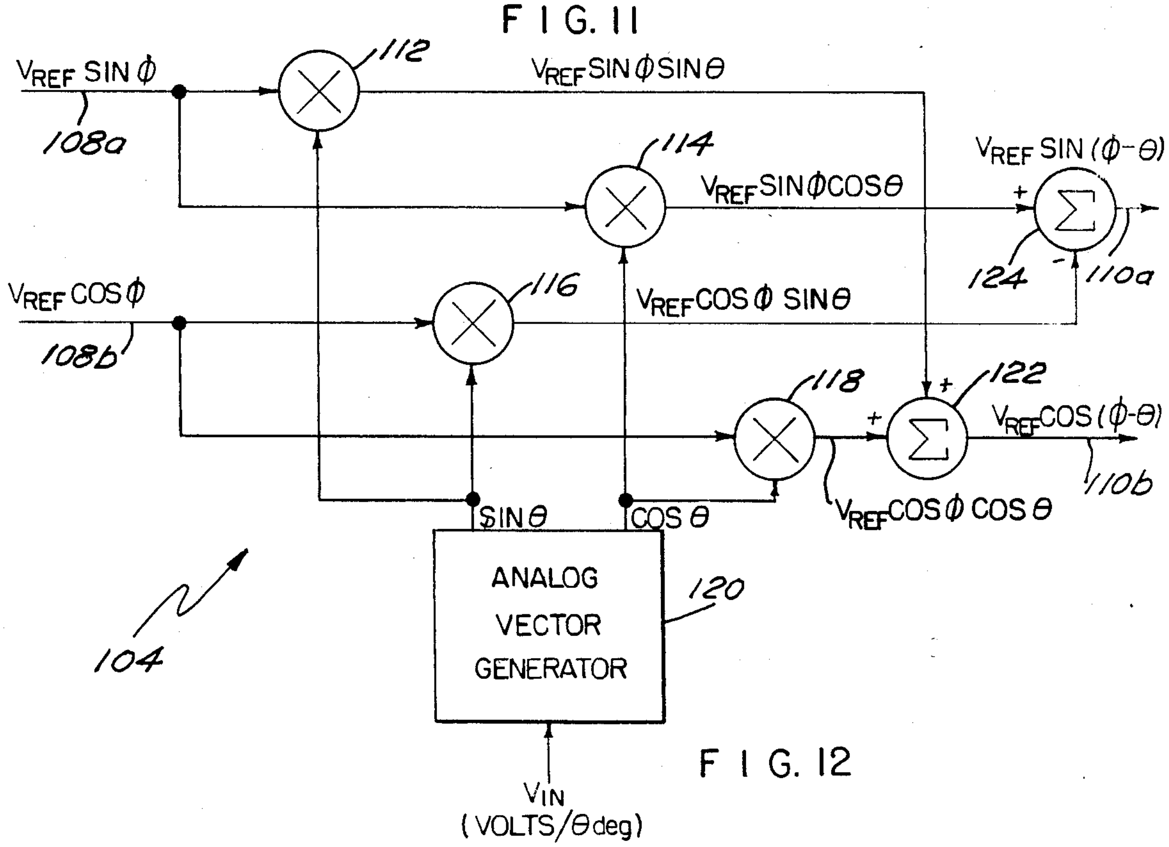
FIG. 12 shows a block diagram of an analog modulator.

A block diagram of an analog modulator 104 is shown in FIG. 12. Modulator 104 further comprises multipliers 112, 114, 116 and 118, analog vector generator 120, summer 122 and summer 124. Input signals $V_{REF}$SIN $\phi$ and $V_{REF}$COS $\phi$ from input Scott-T transformer 102 are combined with signals SIN $\theta$ and COS $\theta$ from analog vector generator 120 in multipliers 112, 114, 116 and 118 and selectively added in summers 122 and 124 to produce output signals $V_{REF}$SIN $(\phi-\theta)$ and $V_{REF}$COS $(\phi-\theta)$ as shown in FIG. 12. Analog modulator 104 operates as follows: In order for the output of output Scott-T transformer 106 of FIG. 11 to be '$(\phi-\theta)$', the input signals must be $$V_{REF}[\text{SIN } (\phi-\theta)] \text{ and} \tag{17}$$

$$V_{REF}[\text{COS } (\phi-\theta)]. \tag{18}$$

Using trigonometric identities, equations (17) and (18) become $$V_{REF}[\text{SIN}(\phi-\theta)]=[V_{REF}(\text{SIN}\ \phi)](\text{COS}\ \theta)-[V_{REF}(\text{COS}\ \phi)](\text{SIN}\ \theta) \quad (19)$$

and, $$V_{REF}[\text{COS}(\phi-\theta)]=[V_{REF}(\text{COS}\ \phi)](\text{COS}\ \theta)+[V_{REF}(\text{SIN}\ \phi)](\text{SIN}\ \theta) \quad (20)$$

respectively. It is noted that $V_{REF}$ (SIN $\phi$) and $V_{REF}$ (COS $\phi$) are the output signals of input Scott-T transformer 102. SIN $\theta$ and COS$\theta$ are generated from an input analog voltage scaled to $\theta$. These signals are then cross-multiplied, added and subtracted as shown in FIG. 12 and described in equations (19) and (20), to obtain the desired result. The multiplications are performed using any of the "off-the-shelf" integrated circuit multipliers while the sum and difference functions are performed using presently available integrated circuit op-amps.

Figure 13:
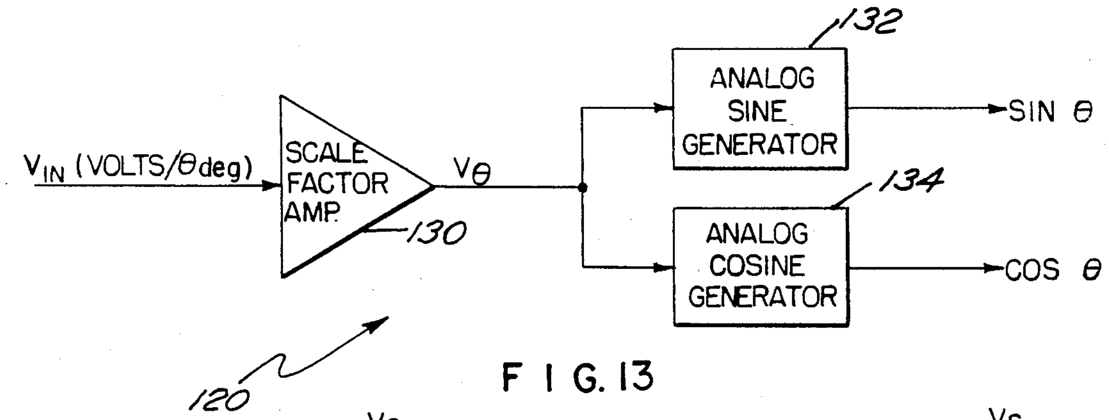
FIG. 13 shows a simplified block diagram of a basic analog vector generator.
Figure 14:
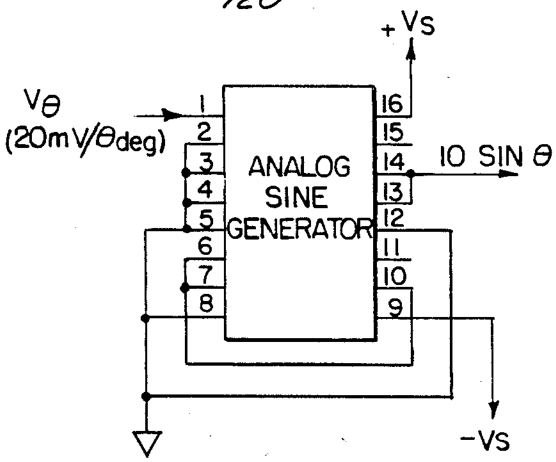
FIG. 14 shows an analog sine generator.
Figure 15:
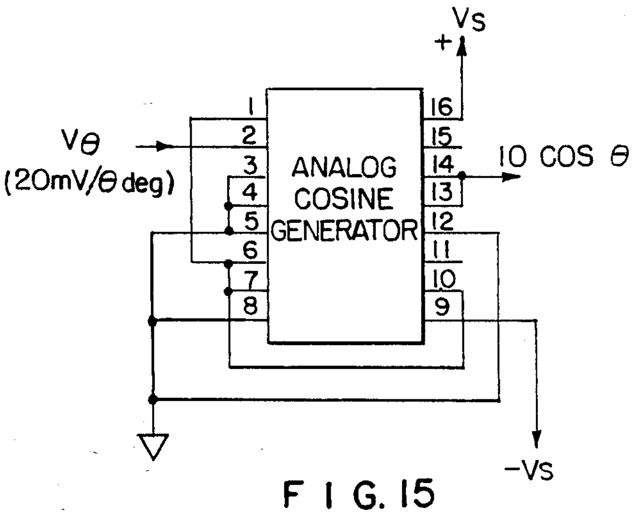
FIG. 15 shows an analog cosine generator.

FIG. 13 shows block diagram of analog vector generator 120 of FIG. 12. The output signals SIN $\theta$ and COS $\theta$ are generated from an input analog voltage corresponding to a preselected shaft angle $\theta$. An input scale factor amplifier 130 converts the given input scale factor $V_\theta$, which is usually linear, to that required by the analog SINE and COSINE generators, 132 and 134 respectively. Generators 132 and 134 can be implemented using an analog computational integrated circuit such as a Model AD639 Universal Trigonometric Function Generator manufactured by Analog Devices, Inc or the like. Model AD639 is readily available "off-the-shelf," and can be configured so as to generate either SIN $\theta$ or COS $\theta$ outputs as shown in FIGS. 14 and 15.

Figure 16:
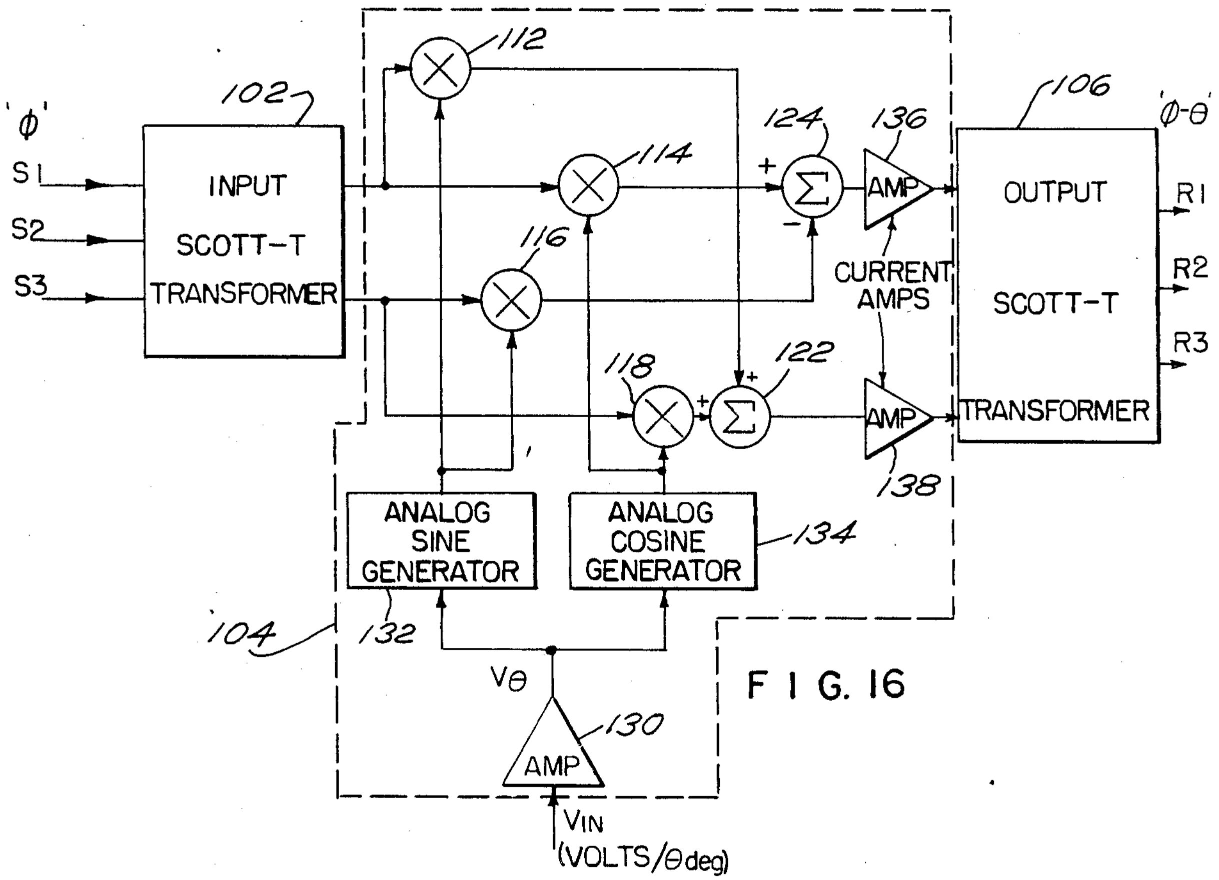
FIG. 16 shows a detailed block diagram of an AECDX.

A detailed block diagram of the AECDX of the present invention is shown in FIG. 16. Amplifiers 136 and 138, inserted after sum and difference amps 122 and 124, but before output transformer 106, are unity-voltage-gain current amplifiers. These amps may be necessary in cases where output transformer 106 is required to drive a substantial load such as a synchro, e.g., a CT.

The advantages of the AECDX of the present invention over the prior art are: "infinite" resolution, no moving parts required, significant size reduction, and stability, i.e., no feedback needed.

What has thus been described is a linear, analog, synchro control differential transmitter means for implementing the common synchro CDX function whereby a scaled linear analog voltage is used as input instead of a mechanical shaft angular displacement. Alternate synchro functions of CT and CX that the invention implements are also disclosed.

Obviously many modifications and variations of the present invention may become apparent in light of the above teachings. For example; should the Model AD639 be discontinued or be undesirable for some designs, vector generation can still be accomplished by a number of alternative methods, each based on implicit or explicit numerical approximation techniques.

Figure 17:
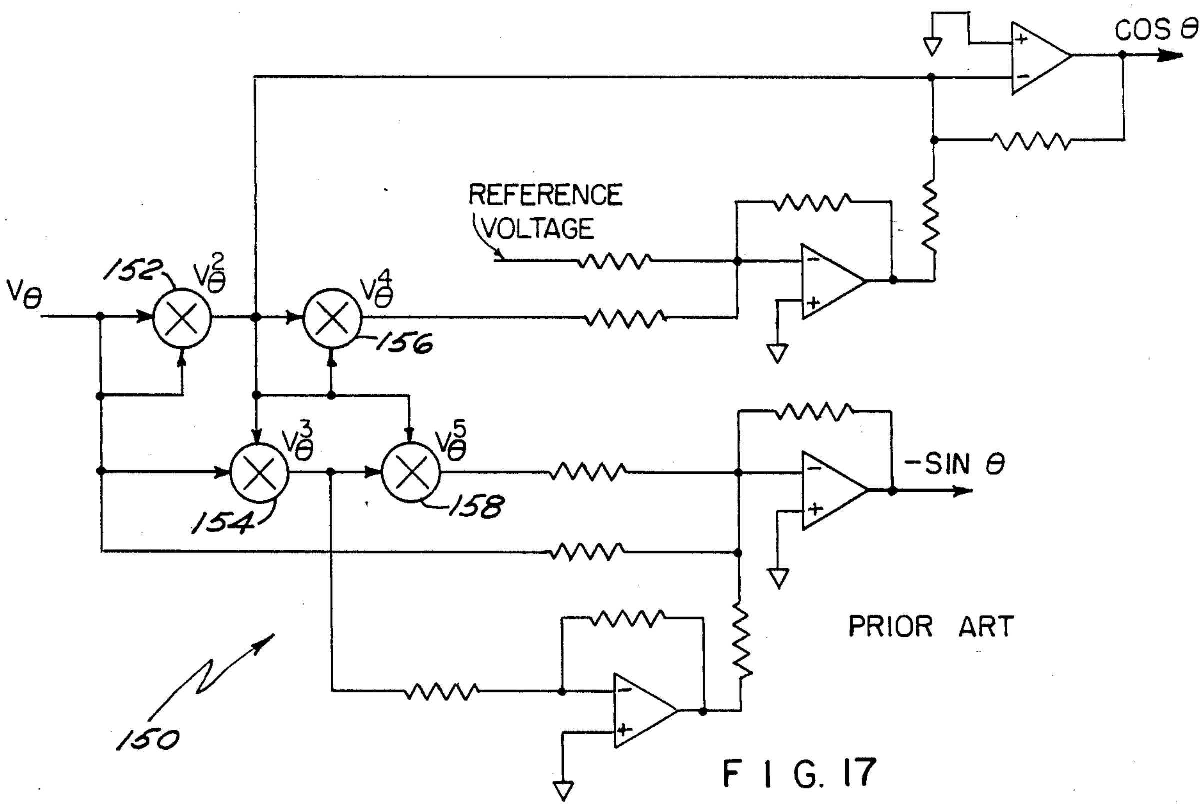
FIG. 17 shows a schematic diagram of a well known alternate analog vector generator.

FIG. 17 shows one such alternate vector generator 150 in which SINE and COSINE are each generated by a Taylor series approximation of sufficient order. The high order terms are computed by an array of multiplier integrated circuits 152, 154, 156 and 158, and then added or subtracted together as dictated by the appropriate Taylor approximation for that function. Such an implementation of an analog vector generator is well known.

Figure 18:
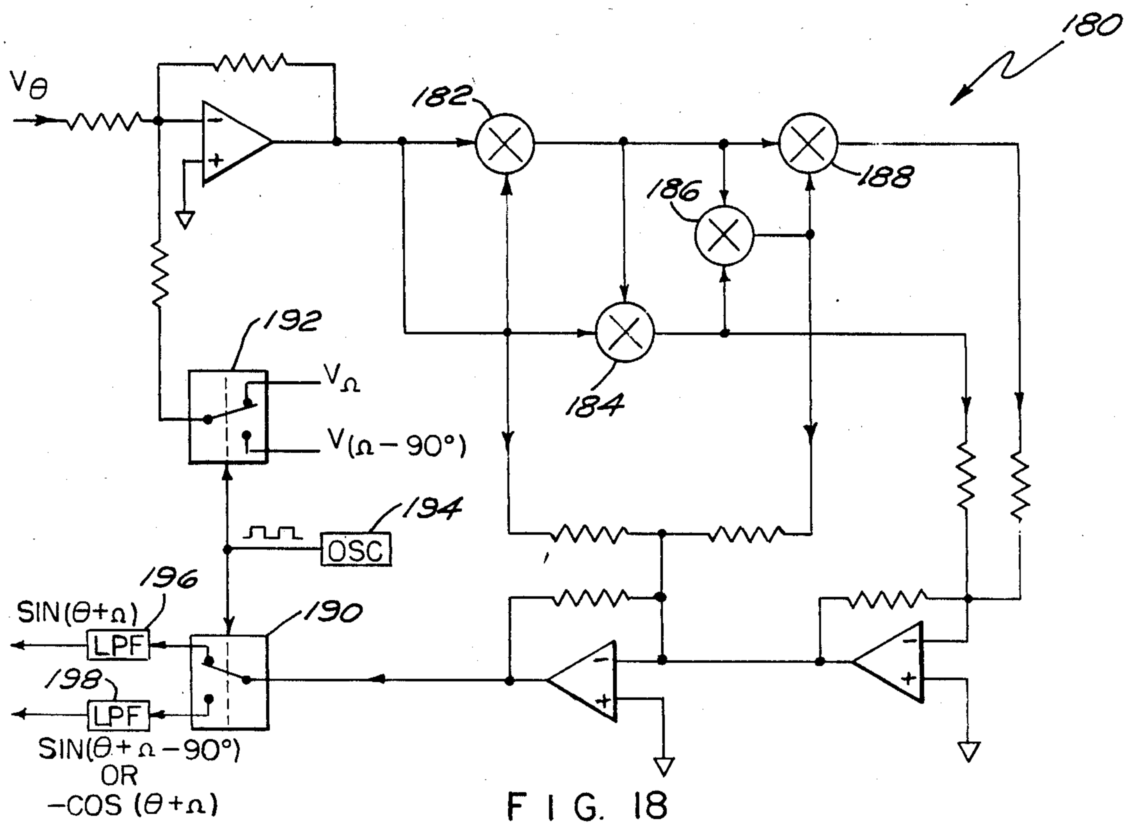
FIG. 18 shows a schematic diagram of a second alternate analog vector generator.

Another vector generator circuit 180, which may be used as part of this invention in lieu of the AD639 is depicted in FIG. 18. The heart of this circuit implementation is use of a single, highly accurate, seventh order, Taylor approximation of the SINE function which is produced using multiplier integrated circuits 182, 184, 186 and 188. Input angle $\theta$ is summed with electronically switched offset angles $\Omega$ and $\Omega-90°$. Thus the output of SINE generator 180 will be, for one oscillator state, SINE of the input angle $\theta$ plus the offset angle $\Omega$, and for the other oscillator state, SINE of the input angle $\theta$ plus the offset angle $\Omega$ minus 90°, which is −COSINE of input angle $\theta$ plus the offset angle $\Omega$. The output of SINE generator 180 is then applied to an electronic switch 190 synchronous with offset angle switch 192. Each output from switch 190 is low-pass filtered resulting in SINE and −COSINE of the input angle plus an offset. The advantage of this technique over generator 150 of FIG. 17 is the increased accuracy of the higher order approximation for a given number of multipliers which also translates as a substantial savings of printed circuit board space for a given accuracy. If the offset angle $\Omega$ is undesirable an input or output transformer, which adds an equal offset angle to the input synchro angle, can be used such that the offsets cancel. The output of an input transformer with an offset $\Omega$ is, $$V_{REF}[\text{SIN}(\phi+\Omega)] \quad (21)$$

$$V_{REF}[\text{COS}(\phi+\Omega)] \quad (22)$$

and the output of a vector generator with an offset $\Omega$ is $$\text{SIN}(\theta+\Omega) \quad (23)$$

$$\text{COS}(\theta+\Omega). \quad (24)$$

As above, these signals are cross-multiplied, and summed and differenced, resulting in, $$V_{REF}[\text{SIN}(\phi+\Omega)]\text{COS}(\theta+\Omega)-V_{REF}[\text{COS}(\phi+\Omega)]\text{SIN}(\theta+\Omega) \quad (25)$$

$$V_{REF}[\text{COS}(\phi+\Omega)]\text{COS}(\theta+\Omega)+V_{REF}[\text{SIN}(\phi+\Omega)]\text{SIN}(\theta+\Omega). \quad (26)$$

By trigonometric identity, these reduce to $$V_{REF}[\text{SIN}[(\phi+\Omega)-(\theta+\Omega)]] \quad (27)$$

$$V_{REF}[\text{COS}[(\phi+\Omega)-(\theta+\Omega)]] \quad (28)$$

or, $$V_{REF}[\text{SIN}(\phi-\theta)] \quad (29)$$

$$V_{REF}[\text{COS}(\phi-\theta)] \quad (30)$$

and the offset angles $\Omega$ are cancelled out.

The offset cancellation technique may be used in conjunction with the AD639 device as it is slightly more accurate when configured in the SINE mode than in the COSINE mode. Thus, two AD639's may each be configured in the SINE mode; one having a positive offset, $\Omega$, added to the input angle to generate the SINE of the input plus offset, and one having a negative offset, $\Omega-90°$, added to the input angle to generate the −COSINE of the input plus offset. The offset is cancelled out by employing an input transformer which offsets an equal amount. In one specific case, because the AD639 is most accurate about zero degrees, the offset was selected to be 45 degrees, and a transformer with an offset of 45 degrees was used.

Figure 19:
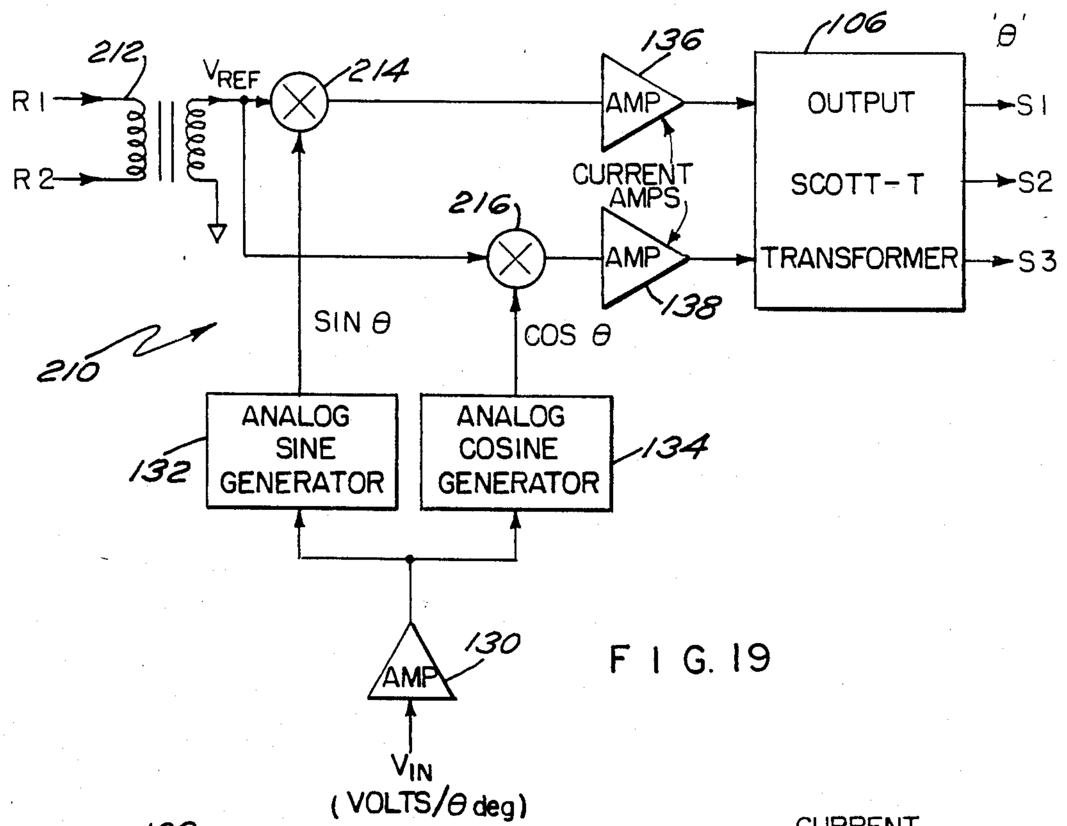
FIG. 19 shows a block diagram of an AECX.

Similar devices based on the techniques of this invention are simple specific cases of the computational circuitry. FIG. 19 illustrates the basic block diagram of an AECX 210. For this device K(SIN$\theta$)(SIN $\omega$t) and K(COS$\theta$)(SIN$\omega$t) are applied to the input of the output Scott-T transformer to provide the CX function. SIN$\theta$ and COS$\theta$ are generated as above, so they only need to be multiplied by K(SIN $\omega$t) or the excitation voltage. An input transformer 212 isolates and scales the high level excitation to the computational circuits if necessary.

Figure 20:
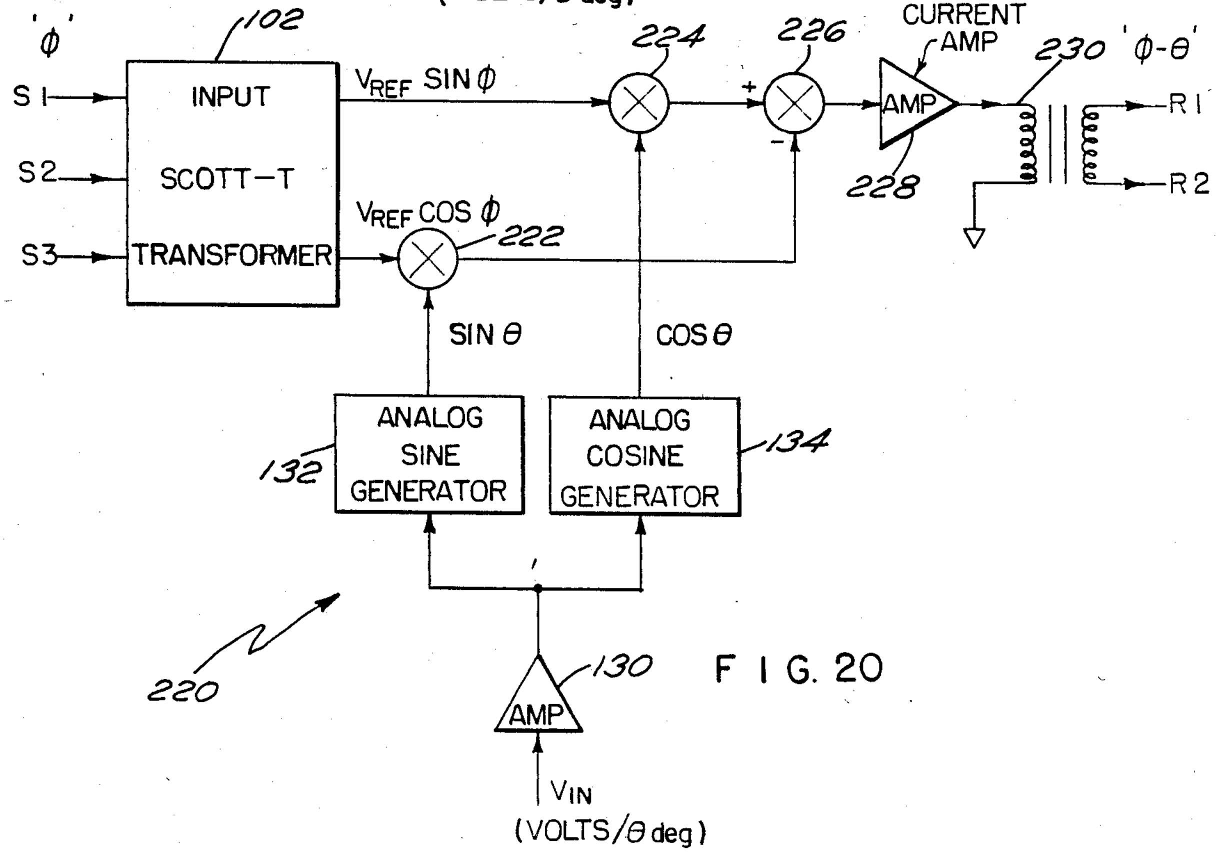
FIG. 20 shows a block diagram of an AECT.

The block diagram of an AECT 220 is shown in FIG. 20 and follows very similarly from above. The output of a CT being the SINE of the difference between two angles, the difference between the products of cross-multiplied SINES and COSINES provides the CT function.

In light of the above, it is therefore understood that within the scope of the appended claims, the invention may be practiced otherwise than as specifically described.

What is claimed is:

1. A control differential transmitter, comprising;

input Scott-T transformer means, adapted to receive synchro signal '$\phi$', for producing $V_{REF}$SIN$\phi$ and $V_{REF}$COS$\phi$ signals therefrom;

analog modulator means, connected to said input transformer means, for receiving said $V_{REF}$SIN$\phi$ and $V_{REF}$COS$\phi$ signals from said input transformer means and a $V_{IN}$ signal $\theta$ and producing "infinite" resolution $V_{REF}$SIN $(\phi-\theta)$ and $V_{REF}$COS $(\phi-\theta)$ output signals therefrom; and output Scott-T transformer means, connected to said analog modulator means, for receiving said $V_{REF}$SIN $(\phi-\theta)$ and $V_{REF}$COS $(\phi-\theta)$ output signals from said analog modulator means and producing output synchro signal '$\phi-\theta$' therefrom.

2. An apparatus according to claim 1 wherein said analog modulator means further comprises;

analog vector generator means, for receiving said $V_{IN}$ signal $\theta$ and producing "infinite" resolution SIN $\theta$ and COS $\theta$ signals therefrom;

multiplier means, connected to said analog vector generator means and said input Scott-T transformer means, for receiving and combining said $V_{REF}$SIN $\phi$, said $V_{REF}$COS $\phi$, said SIN $\theta$ and said COS $\theta$ signals therefrom so as to produce output signals $V_{REF}$SIN $\phi$SIN $\theta$, $V_{REF}$SIN $\phi$COS $\theta$, $V_{REF}$COS $\phi$SIN $\theta$ and $V_{REF}$COS $\phi$COS $\theta$ therewith; and summer means, connected to said multiplier means, for receiving said output signals $V_{REF}$SIN $\phi$SIN $\theta$, $V_{REF}$SIN $\phi$COS $\theta$, $V_{REF}$COS $\phi$SIN $\theta$ and $V_{REF}$COS $\phi$COS $\theta$ and producing said $V_{REF}$SIN $(\phi-\theta)$ and $V_{REF}$COS $(\phi-\theta)$ output signals therefrom.

3. An apparatus according to claim 2 wherein said analog vector generator means further comprises:

a scale factor amplifier, for receiving said $V_{IN}$ and producing $V_\theta$ therefrom;

analog sine generator means, connected to said scale factor amplifier, for receiving said $V_\theta$ output therefrom and producing said "infinite" resolution SIN$\theta$ output; and analog cosine generator means, connected to said scale factor amplifier, for receiving said $V_\theta$ output therefrom and producing said "infinite" resolution COS$\theta$ output.

4. An apparatus according to claim 2 wherein said analog vector generator means further comprises:

a scale factor amplifier, for receiving said $V_{IN}$ and producing $V_\theta$ therefrom; and analog time multiplexed SINE and COSINE generator means, connected to said scale factor amplifier, for receiving said $V_\theta$ output therefrom and producing "infinite" resolution SIN $(\theta-\Omega)$ and $-$COS $(\theta-\Omega)$ outputs where $\Omega$ is a preselected offset angle.

5. An apparatus according to claim 4 wherein said offset $\Omega$ is cancelled by having said input transformer include an equal offset.

6. An apparatus according to claim 4 wherein said offset $\Omega$ is cancelled by having said output transformer include an equal offset.

7. A control transmitter, comprising;

input scale isolation transformer means, adapted to receive an excitation voltage $V_{R1-R2}$, for producing a $V_{REF}$ signal therefrom;

analog modulator means, connected to said input transformer means, for receiving said $V_{REF}$ signal from said input transformer means and a $V_{IN}$ signal $\theta$ and producing "infinite" resolution $V_{REF}$SIN $\theta$ and $V_{REF}$COS $\theta$ output signals therefrom; and output Scott-T transformer means, connected to said analog modulator means, for receiving said $V_{REF}$SIN$\theta$ and $V_{REF}$COS$\theta$ output signals from said analog modulator means and producing output synchro signal '$\theta$' therefrom.

8. An apparatus according to claim 7 wherein said analog modulator means further comprises; analog vector generator means, for receiving said $V_{IN}$signal $\theta$ and producing "infinite" resolution SIN$\theta$ and COS$\theta$ signals therefrom; and multiplier means, connected to said analog vector generator means and said input transformer means, for receiving and combining said $V_{REF}$, said SIN$\theta$ and said COS$\theta$ signals therefrom so as to produce output signals and therewith.

9. An apparatus according to claim 8 wherein said analog vector generator means further comprises:

a scale factor amplifier, for receiving said $V_{IN}$ and producing $V_\theta$ therefrom;

analog sine generator means, connected to said scale factor amplifier, for receiving said $V_\theta$ output therefrom and producing said "infinite" resolution SIN$\theta$ output; and analog cosine generator means, connected to said scale factor amplifier, for receiving said $V_\theta$ output therefrom and producing said "infinite" resolution COS$\theta$ output.

10. An apparatus according to claim 8 wherein said analog vector generator means further comprises:

a scale factor amplifier, for receiving said $V_{IN}$ and producing $V_\theta$ therefrom; and analog time multiplexed SINE and COSINE generator means, connected to said scale factor amplifier, for receiving said $V_\theta$ output therefrom and producing "infinite" resolution SIN$(\theta-\Omega)$ and -COS$(\theta-\Omega)$ outputs where $\Omega$ is a preselected offset angle.

11. An apparatus according to claim 10 wherein said offset Ω is cancelled by having said input transformer include an equal 12. An apparatus according to claim 10 wherein said offset Ω is cancelled by having said output transformer include an equal 13. A control transformer, comprising;

input Scott-T transformer means, adapted to receive synchro signal '$\phi$', for producing $V_{REF}SIN\phi$ signal '$\phi$', for producing $V_{REF}SIN\phi$ and $V_{REF}COS\phi$ signals therefrom;

analog modulator means, connected to said input transformer means, for receiving said $V_{REF}SIN\phi$ and $V_{REF}COS\phi$ signals from said input transformer means and a $V_{IN}$ signal $\theta$ and producing "infinite" resolution $V_{REF}SIN(\phi-\theta)$ output signal therefrom; and output scale isolation transformer means, connected to said analog modulator means, for receiving said $V_{REF}SIN(\phi-\theta)$ output signal from said analog modulator means and producing a scaled, isolated output resolver signal '$\phi-\theta$' therefrom.

14. An apparatus according to claim 13 wherein said analog modulator means further comprises;

analog vector generator means, for receiving said $V_{IN}$ signal $\theta$ and producing "infinite" resolution $SIN\theta$ and $COS\theta$ signals therefrom;

multiplier means, connected to said analog vector generator means and said input Scott-T transformer means, for receiving and combining said $V_{REF}SIN\phi$, said $V_{REF}COS\phi$, said $SIN\theta$ and said $COS\theta$ signals therefrom so as to produce output signals $V_{REF}SIN\phi COS\theta$ and $V_{REF}COS\phi SIN\theta$ therewith; and summer means, connected to said multiplier means, for receiving said output signals $V_{REF}SIN\phi COS\theta$ and $V_{REF}COS\phi SIN\theta$ and producing said $V_{REF}SIN(\phi-\theta)$ output signal therefrom.

15. An apparatus according to claim 14 wherein said analog vector generator means further comprises:

a scale factor amplifier, for receiving said $V_{IN}$ and producing $V_\theta$ therefrom;

analog sine generator means, connected to said scale factor amplifier, for receiving said $V_\theta$ output therefrom and producing said "infinite" resolution $SIN\theta$ output; and analog cosine generator means, connected to said scale factor amplifier, for receiving said $V_\theta$ output therefrom and producing said "infinite" resolution $COS\theta$ output.

16. An apparatus according to claim 14 wherein said analog vector generator means further comprises:

a scale factor amplifier, for receiving said $V_{IN}$ and producing $V_\theta$ therefrom; and analog time multiplexed SINE and COSINE generator means, connected to said scale factor amplifier, for receiving said $V_\theta$ output therefrom and producing "infinite" resolution $SIN(\theta-\Omega)$ and $-COS(\theta-\Omega)$ outputs where Ω is a preselected offset angle.

17. An apparatus according to claim 16 wherein said offset Ω is cancelled by having said input transformer include an equal offset.

18. An apparatus according to claim 16 wherein said offset Ω is cancelled by having said output transformer include an equal offset.

* * * * *